US012659882B2

(12) United States Patent
Takahashi

(10) Patent No.: US 12,659,882 B2
(45) Date of Patent: Jun. 16, 2026

(54) TERMINAL APPARATUS, BASE STATION, AND COMMUNICATION METHOD

(71) Applicants: DENSO CORPORATION, Kariya-city (JP); TOYOTA JIDOSHA KABUSHIKI KAISHA, Toyota (JP)

(72) Inventor: Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 18/404,318

(22) Filed: Jan. 4, 2024

(65) Prior Publication Data

US 2024/0137876 A1    Apr. 25, 2024
US 2024/0236876 A9    Jul. 11, 2024

Related U.S. Application Data

(63) Continuation of application No. PCT/JP2022/025405, filed on Jun. 24, 2022.

(30) Foreign Application Priority Data

Jul. 9, 2021    (JP) ................................. 2021-114190

(51) Int. Cl.
H04W 52/36        (2009.01)
H04W 8/22         (2009.01)
H04W 52/42        (2009.01)

(52) U.S. Cl.
CPC ........... *H04W 52/367* (2013.01); *H04W 8/22* (2013.01); *H04W 52/42* (2013.01)

(58) Field of Classification Search
CPC ..... H04W 52/367; H04W 8/22; H04W 52/42; H04W 8/24; H04W 72/04
See application file for complete search history.

(56) References Cited

U.S. PATENT DOCUMENTS

2017/0181107 A1*    6/2017    Roji ......................... H04B 1/04
2022/0361089 A1*    11/2022    Ioffe ....................... H04W 8/24
(Continued)

OTHER PUBLICATIONS

3GPP RAN WG4 #99-e, R4-2109442, Electronic Meeting, May 19-27, 2021, Apple, Skyworks Solutions Inc., T-Mobile USA, "Supporting evolving regulation in band n77 for US 3.45 to 3.55 GHz usage", pp. 1-6.
(Continued)

*Primary Examiner* — Hashim S Bhatti
(74) *Attorney, Agent, or Firm* — Harness, Dickey & Pierce, P.L.C.

(57) ABSTRACT

A terminal apparatus (TA) is configured to: transmit capability information including radio frequency (RF) parameters; include an information bit indicating that the TA supports restricted ranges of a frequency band (FB) in a specific area and an information bit indicating that the TA supports a modified maximum power reduction (MPR) indicated per FB in the RF parameters, in a case where the TA supports first restricted ranges of the FB in the specific area and the modified MPR indicated per FB; and not include the information bit indicating that the TA supports the restricted ranges of the FB in the specific area in the RF parameters and include the information bit indicating that the TA supports the modified MPR indicated per FB in the RF parameters, in a case where the TA supports a second range of the FB in the specific area and the modified MPR indicated per FB.

6 Claims, 10 Drawing Sheets

(56)                    References Cited

U.S. PATENT DOCUMENTS

2024/0298272  A1 *    9/2024   Umeda  .............  H04W 72/0453
2024/0340810  A1 *   10/2024   Umeda  ..............  H04W 52/367

OTHER PUBLICATIONS

3GPP TSG-RAN WG4 Meeting #99-e, R4-2109174, Electronic
Meeting, May 19-27, 2021, MediaTek Inc., "Discussion on enabling
US 3.45-3.55GHz in Band n77", pp. 1-4.
3GPP TS 38.101-1 V17.1.0 (Mar. 2021), "3rd Generation Partner-
ship Project; Technical Specification Group Radio Access Network;
NR; User Equipment (UE) radio transmission and reception; Part 1:
Range 1 Standalone (Release 17)", pp. 1-513.
International Search Report dated Jul. 22, 2022 in corresponding
Application No. PCT/JP2022/025405.
3GPP TSG-RAN WG4 Meeting #99-e, R4-2107971, Electronic
Meeting, May 19-27, 2021, Apple, "Email discussion summary for
[99-e][161] US_n77", pp. 1-20.

* cited by examiner

183 RF CIRCUIT

185 PROCESSOR

187 MEMORY

189 STORAGE

```
-- ASN1START
-- TAG-RF-PARAMETERS-START

RF-Parameters ::=              SEQUENCE {
supportedBandListNR           SEQUENCE (SIZE (1..maxBands)) OF BandNR,
[...]
}

BandNR ::=           SEQUENCE {
bandNR               FreqBandIndicatorNR,
modifiedMPR-Behaviour         BIT STRING (SIZE (8))                OPTIONAL,
[...]
[[
handoverUTRA-FDD-r16              ENUMERATED {supported}                           OPTIONAL,
-- R4 7-4: Report the shorter transient capability supported by the UE: 2, 4 or 7us
enhancedUL-TransientPeriod-r16       ENUMERATED {us2, us4, us7}              OPTIONAL,
sharedSpectrumChAccessParamsPerBand-v1640  SharedSpectrumChAccessParamsPerBand-v1640   OPTIONAL
]],
[[
modifiedRestrictedRange-r16           BIT STRING (SIZE (8))                OPTIONAL
]]
}

-- TAG-RF-PARAMETERS-STOP
-- ASN1STOP
```

| NR Band | Index of field (bit number) | Definition (description of the supported functionality if indicator set to one) | Notes |
|---|---|---|---|
| n77 | 0 (leftmost bit) | In the USA, the UE supports the restricted operating frequency range of 3450 – 3550 MHz and 3700 – 3980 MHz. | |
| | 1 | [To be specified] | |
| | 2 | [To be specified] | |
| | [...] | [...] | [...] |
| [...] | [...] | [...] | [...] |

| Definitions for parameters | Per | M | FDD-TDD DIFF | FR1-FR2 DIFF |
|---|---|---|---|---|
| *[...]* | *[...]* | *[...]* | *[...]* | *[...]* |
| modifiedMPR-Behaviour<br><br>Indicates whether UE supports modified MPR behaviour defined in TS 38.101-1 [2] and TS 38.101-2 [3]. | Band | No | N/A | N/A |
| modifiedRestrictedRange-r16<br><br>Indicates whether UE supports modified restricted operating frequency range defined in TS 38.101-1 [2] and TS 38.101-2 [3]. The absence of this field means that the UE supports the restricted operating frequency range as defined in clause 5.1 of TS 38.101-1 version X.Y.X [2] and TS 38.101-2 version X.Y.Z [3] for the given band. | Band | No | N/A | N/A |

30

TERMINAL APPARATUS, BASE STATION, AND COMMUNICATION METHOD

CROSS-REFERENCE TO RELATED APPLICATIONS

The present application is a continuation application of International Application No. PCT/JP2022/025405, filed on Jun. 24, 2022, which claims the benefit of priority to Japanese Patent Application No. 2021-114190, filed on Jul. 9, 2021, the contents of which are incorporated herein by reference in their entirety.

BACKGROUND

1. Technical Field

The present disclosure relates to a terminal apparatus, a base station, and a communication method.

2. Related Art

Mobile communication technologies have been proposed and standardized as technical specifications (TSs) in 3rd Generation Partnership Project (3GPP). The TSs define frequency bands for communication between a user equipment (UE) and a base station.

SUMMARY

A terminal apparatus comprising: a communicator configured to transmit, to a base station apparatus, capability information including radio frequency parameters; and a processor configured to: include an information bit indicating that the terminal apparatus supports restricted ranges of a frequency band in a specific area and an information bit indicating that the terminal apparatus supports a modified maximum power reduction indicated per frequency band in the radio frequency parameters, in a case where the terminal apparatus supports first restricted ranges of the frequency band in the specific area and the modified maximum power reduction indicated per frequency band; and not include the information bit indicating that the terminal apparatus supports the restricted ranges of the frequency band in the specific area in the radio frequency parameters and include the information bit indicating that the terminal apparatus supports the modified maximum power reduction indicated per frequency band in the radio frequency parameters, in a case where the terminal apparatus supports a second range of the frequency band in the specific area and the modified maximum power reduction indicated per frequency band, wherein the modified maximum power reduction is defined based on a value of the maximum power reduction and a number of resource blocks.

A base station comprising: a communicator configured to receive, from a terminal apparatus, capability information including radio frequency parameters; and a processor configured to: obtain an information bit indicating that the terminal apparatus supports restricted ranges of a frequency band in a specific area and an information bit indicating that the terminal apparatus supports a modified maximum power reduction indicated per frequency band from the radio frequency parameters, in a case where the terminal apparatus supports first restricted ranges of the frequency band in the specific area and the modified maximum power reduction indicated per frequency band; and obtain the information bit indicating that the terminal apparatus supports the modified maximum power reduction indicated per frequency band from the radio frequency parameters, in a case where the terminal apparatus supports the modified maximum power reduction indicated per frequency band, wherein the information bit indicating that the terminal apparatus supports the restricted ranges of the frequency band in the specific area is not included in the radio frequency parameters in a case where the terminal apparatus supports a second range of the frequency band in the specific area, and the modified maximum power reduction is defined based on a value of the maximum power reduction and a number of resource blocks.

A communication method of a terminal apparatus comprising: transmitting, to a base station apparatus, capability information including radio frequency parameters; including an information bit indicating that the terminal apparatus supports restricted ranges of a frequency band in a specific area and an information bit indicating that the terminal apparatus supports a modified maximum power reduction indicated per frequency band in the radio frequency parameters, in a case where the terminal apparatus supports first restricted ranges of the frequency band in the specific area and the modified maximum power reduction indicated per frequency band; and not including the information bit indicating that the terminal apparatus supports the restricted ranges of the frequency band in the specific area in the radio frequency parameters and including the information bit indicating that the terminal apparatus supports the modified maximum power reduction indicated per frequency band in the radio frequency parameters, in a case where the terminal apparatus supports a second range of the frequency band in the specific area and the modified maximum power reduction indicated per frequency band, wherein the modified maximum power reduction is defined based on a value of the maximum power reduction and a number of resource blocks.

BRIEF DESCRIPTION OF THE DRAWINGS

FIG. 1 is an explanatory diagram illustrating an example of a schematic configuration of a system according to embodiments of the present disclosure.

FIG. 3 is a block diagram illustrating an example of a schematic hardware configuration of the user equipment according to embodiments of the present disclosure.

FIG. 5 is a block diagram illustrating an example of a schematic hardware configuration of the base station according to embodiments of the present disclosure.

FIG. 6 is a diagram for explaining an example of capability information including frequency range information according to embodiments of the present disclosure.

FIG. 7 is a diagram for explaining an example of the frequency range information according to embodiments of the present disclosure.

FIG. 8 is a diagram for explaining an example of a definition related to presence or absence of the frequency range information according to embodiments of the present disclosure.

DETAILED DESCRIPTION OF THE PREFERRED EMBODIMENTS

Figure 2:
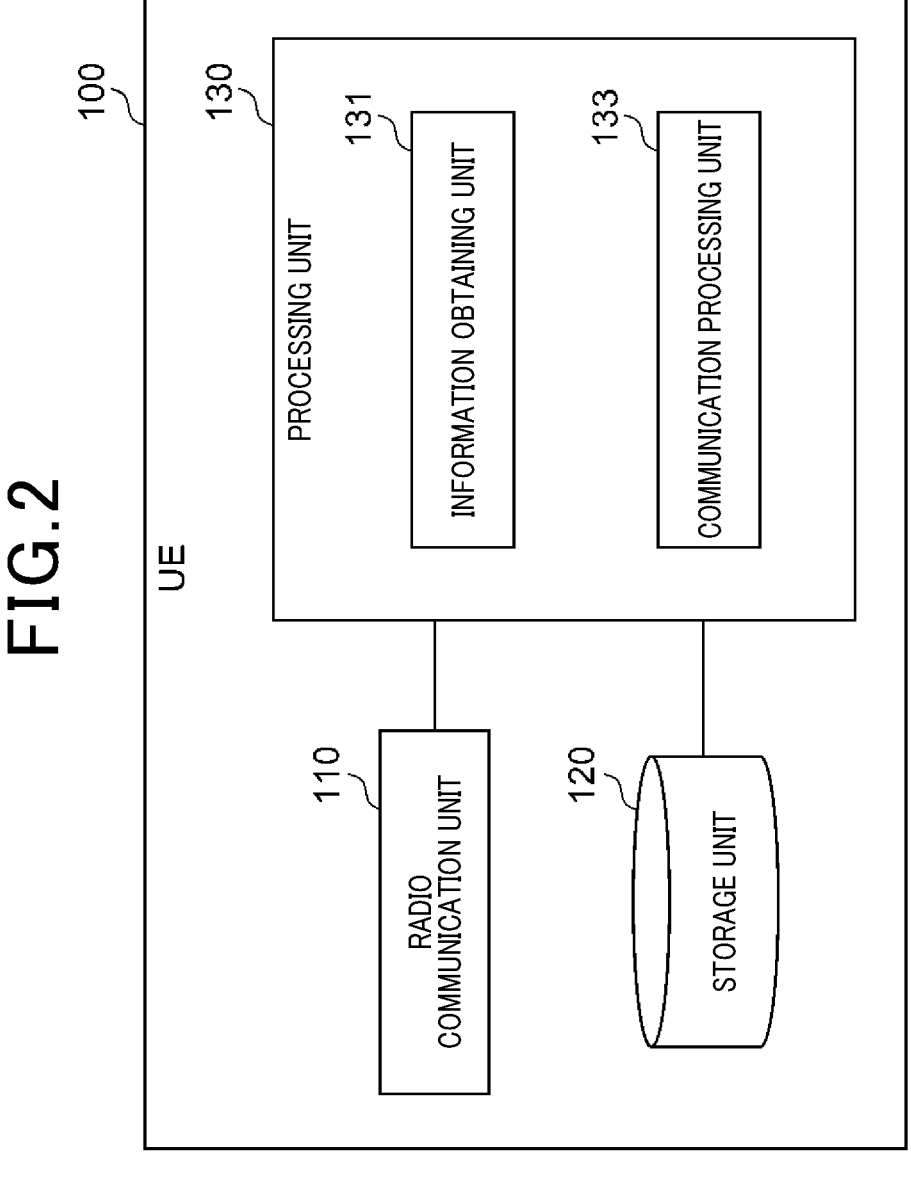
FIG. 2 is a block diagram illustrating an example of a schematic functional configuration of a user equipment according to embodiments of the present disclosure.

For example, 3GPP TS 38.101-1 V17.1.0 defines an operating frequency band (operating band) for new radio (NR). The operating frequency band is reported to a base station as a UE capability. Further, the frequency range available for the operating frequency band is limited in a specific area. For example, the frequency range available for an operating frequency band n77 (3300 to 4200 MHz) was limited to 3700 to 3980 MHz in the United States of America (USA). The USA has, however, amended the laws and regulations to add 3450 to 3550 MHz as the frequency range available for the operating frequency band n77. This can cause there to be a mixture of UEs supporting 3450 to 3550 MHz and UEs not supporting 3450 to 3550 MHz. To address this, studies have been begun on methods for determining whether or not UEs support 3450 to 3550 MHz as described in R4-2107971 in 3GPP TSG RAN WG4 Meeting #99-e. Specifically, R4-2107971 describes that the determination is made by using modified maximum power reduction (MPR) behavior, which is one of the UE capabilities, or a new UE capability.

However, a detailed study by the inventor has revealed the following issue. That is, the method described in R4-2107971 in which modified MPR behavior is used can lead to lowered extensibility. For example, the method uses modified MPR behavior for both an MPR and an available frequency range. As any one of the MPR or the available frequency range has more modifications, the remaining resources of modified MPR behavior thus decrease. In other words, it can be said that extensibility is low for increasing modifications of the MPR and the available frequency range. In particular, each of areas can amend the laws and regulations related to an available frequency range. It is thus requested to secure extensibility for at least modifications of the available frequency ranges. Meanwhile, R4-2107971 does not specifically disclose any new UE capability.

An object of the present disclosure is to provide a terminal apparatus, a base station, and a communication method that each make it possible to increase extensibility for modifications of frequency ranges available to a user equipment in an allocated frequency band.

An apparatus according to an aspect of the present disclosure includes: an information obtaining unit; and a communication processing unit. The information obtaining unit is configured to obtain first information and second information. The first information is used to identify a frequency band allocated to communication between the apparatus and a base station. The second information is used to identify a restriction supported by the apparatus. The communication processing unit is configured to transmit capability information to the base station. The capability information includes the first information and the second information. The restriction includes a restriction on at least a part of a frequency range of the frequency band in a specific area.

An apparatus according to an aspect of the present disclosure includes: a communication processing unit; and an information obtaining unit. The communication processing unit is configured to receive capability information from a user equipment. The capability information includes first information and second information. The first information is used to identify a frequency band allocated to communication between the user equipment and the apparatus. The second information is used to identify a restriction supported by the user equipment. The information obtaining unit is configured to obtain the first information and the second information from the capability information. The restriction includes a restriction on at least a part of a frequency range of the frequency band in a specific area.

A method performed by an apparatus according to an aspect of the present disclosure includes: obtaining first information and second information; and transmitting capability information to a base station. The first information is used to identify a frequency band allocated to communication between the apparatus and the base station. The second information is used to identify a restriction supported by the apparatus. The capability information includes the first information and the second information. The restriction includes a restriction on at least a part of a frequency range of the frequency band in a specific area.

A method performed by an apparatus according to an aspect of the present disclosure includes: receiving capability information including first information and second information from a user equipment; and obtaining the first information and the second information from the capability information. The first information is used to identify a frequency band allocated to communication between the user equipment and the apparatus. The second information is used to identify a restriction supported by the user equipment. The restriction includes a restriction on at least a part of a frequency range of the frequency band in a specific area.

According to the present disclosure, it is possible to increase extensibility for modifications of frequency ranges available to a user equipment in an allocated frequency band. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:
1. Configuration of System
2. Configuration of User Equipment
3. Configuration of Base Station
4. Operation Examples
5. Modification Examples

1. Configuration of System

Figure 1:
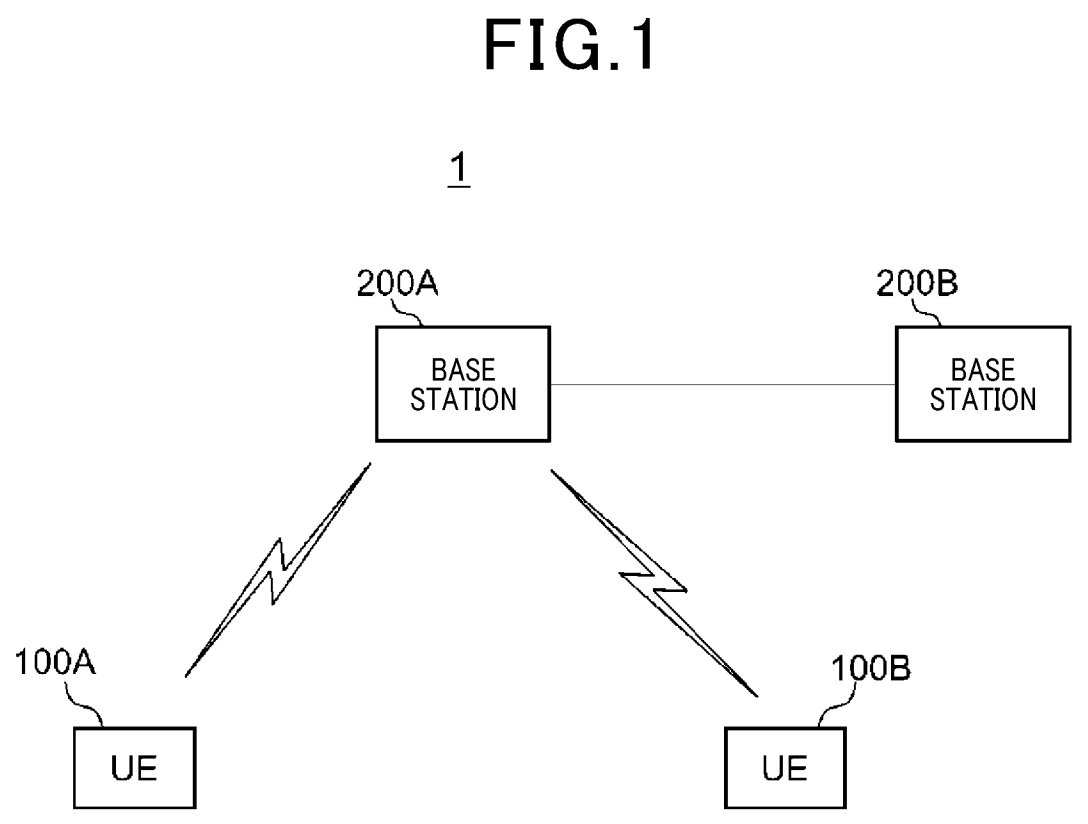

An example of a configuration of a system 1 according to embodiments of the present disclosure will be described with reference to FIG. 1. Referring to FIG. 1, the system 1 includes UEs 100 (a UE 100A and a UE 100B) and base stations 200 (a base station 200A and a base station 200B).

For example, the system 1 is a system compliant with technical specifications (TSs) in Third Generation Partnership Project (3GPP). More specifically, for example, the system 1 is a system compliant with the TSs of 5G or new radio (NR). Naturally, the system 1 is not limited to this example.

(1) Base Station 200

The base station 200 is a node in a radio access network (RAN) and communicates with a UE (for example, UE 100) located within the coverage area of the base station 200.

For example, the base station 200 communicates with a UE (for example, UE 100) by using a RAN protocol stack.

For example, the protocol stack includes protocols of radio resource control (RRC), service data adaptation protocol (SDAP), packet data convergence protocol (PDCP), radio link control (RLC), medium access control (MAC), and physical (PHY) layers. Alternatively, the protocol stack does not have to include all of these protocols, but may include some of these protocols.

For example, the base station 200 is a gNB. The gNB is a node that provides NR user plane and control plane protocol terminations towards a UE and is connected to a 5G core network (5GC) via an NG interface. Alternatively, the base station 200 may be an en-gNB. The en-gNB is a node that provides NR user plane and control plane protocol terminations toward a UE and operates as a secondary node in E-UTRA-NR dual connectivity (EN-DC).

The base station 200 may include a plurality of nodes. The plurality of nodes may include a first node that hosts higher layers included in the protocol stack and a second node that hosts lower layers included in the protocol stack. The higher layers may include the RRC layer, the SDAP layer, and the PDCP layer, while the lower layers may include the RLC layer, the MAC layer, and the PHY layer. The first node may be a central unit (CU) and the second node may be a distributed unit (DU). Note that the plurality of nodes may include a third node that performs lower level processing of the PHY layer and the second node may perform higher level processing of the PHY layer. The third node may be a radio unit (RU).

Alternatively, the base station 200 may be one of the plurality of nodes and may be connected to another unit of the plurality of nodes.

The base station 200 may be an integrated access and backhaul (IAB) donor or an IAB node.

In addition, the base station 200 communicates with another base station via an Xn interface. An Xn control plane (Xn-C) is used for signaling with a neighbor base station. For example, the signaling of Xn-C is based on an Xn application protocol (XnAP). An Xn user plane (Xn-U) is used for the transmission of application data to a neighbor base station.

(2) UE 100

The UE 100 communicates with the base station 200 when being located within the coverage area of the base station 200. The UE 100 receives a signal from the base station 200 on a downlink and transmits a signal to the base station 200 on an uplink. In other words, the UE 100 communicates with the base station 200 via an Uu interface.

For example, the UE 100 communicates with a base station (for example, base station 200) by using the protocol stack.

2. Configuration of User Equipment

Figure 3:
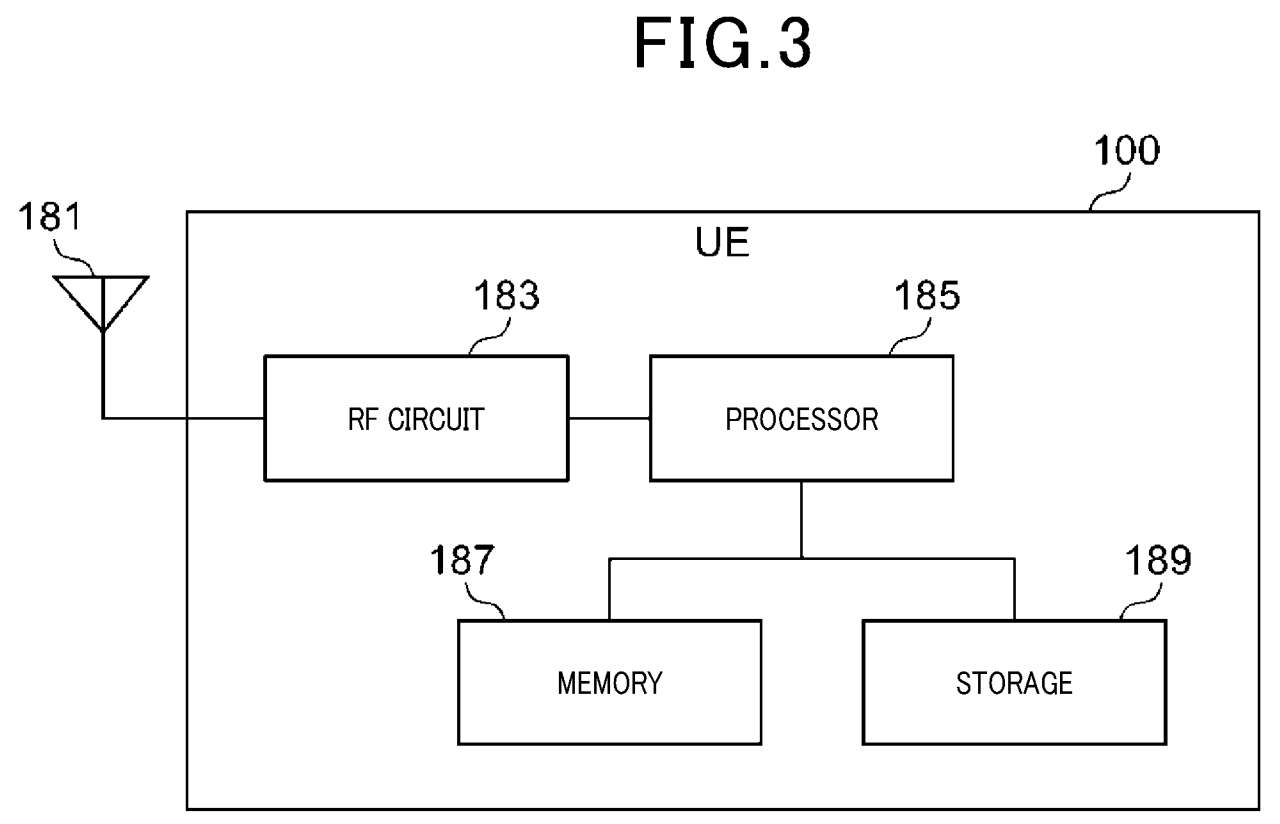

An example of a configuration of the UE 100 according to embodiments of the present disclosure will be described with reference to FIGS. 2 and 3.

(1) Functional Configuration

First, an example of a functional configuration of the UE 100 according to embodiments of the present disclosure will be described with reference to FIG. 2. Referring to FIG. 2, the UE 100 includes a radio communication unit 110, a storage unit 120, and a processing unit 130.

The radio communication unit 110 wirelessly transmits and receives signals. For example, the radio communication unit 110 receives a signal from a base station and transmits a signal to the base station. For example, the radio communication unit 110 receives a signal from another UE and transmits a signal to the other UE.

The storage unit 120 stores various kinds of information for the UE 100.

The processing unit 130 provides various functions of the UE 100. The processing unit 130 includes an information obtaining unit 131 and a communication processing unit 133. Note that the processing unit 130 may further include another component in addition to these components. That is, the processing unit 130 may also perform an operation other than operations of these components. Specific operations of the information obtaining unit 131 and the communication processing unit 133 will be described in detail later.

For example, the processing unit 130 (communication processing unit 133) communicates with a base station (for example, base station 200) or another UE via the radio communication unit 110.

(2) Hardware Configuration

Next, an example of a hardware configuration of the UE 100 according to embodiments of the present disclosure will be described with reference to FIG. 3. Referring to FIG. 3, the UE 100 includes an antenna 181, a radio frequency (RF) circuit 183, a processor 185, a memory 187, and a storage 189.

The antenna 181 converts signals into radio waves and emits the radio waves into the air. In addition, the antenna 181 receives radio waves in the air and converts the radio waves into signals. The antenna 181 may include a transmitting antenna and a receiving antenna or may be a single antenna for transmission and reception. The antenna 181 may be a directional antenna and may include a plurality of antenna elements.

The RF circuit 183 performs analog processing on signals that are transmitted and received via the antenna 181. The RF circuit 183 may include a high-frequency filter, an amplifier, a modulator, a lowpass filter, and the like.

The processor 185 performs digital processing on signals that are transmitted and received via the antenna 181 and the RF circuit 183. The digital processing includes processing of the RAN protocol stack. The processor 185 may include a plurality of processors or may be a single processor. The plurality of processors may include a baseband processor that performs the digital processing and one or more processors that perform other processing.

The memory 187 stores a program to be executed by the processor 185, a parameter related to the program, and other various kinds of information. The memory 187 may include at least one of a ROM, an EPROM, an EEPROM, a RAM, and a flash memory. The whole or part of the memory 187 may be included in the processor 185.

The storage 189 stores various kinds of information. The storage 189 may include at least one of an SSD and an HDD.

The radio communication unit 110 may be implemented by the antenna 181 and the RF circuit 183. The storage unit 120 may be implemented by the storage 189. The processing unit 130 may be implemented by the processor 185 and the memory 187.

The processing unit 130 may be implemented by a system on a chip (SoC) including the processor 185 and the memory 187. The SoC may include the RF circuit 183 and the radio communication unit 110 may also be implemented by the SoC.

Given the hardware configuration described above, the UE 100 may include a memory (that is, memory 187) that stores a program and one or more processors (that is, processor 185) capable of executing the program and the one or more processors may perform operations of the processing unit 130 by executing the program. The program may be a program for causing the processors to execute the operations of the processing unit 130.

3. Configuration of Base Station

Figure 4:
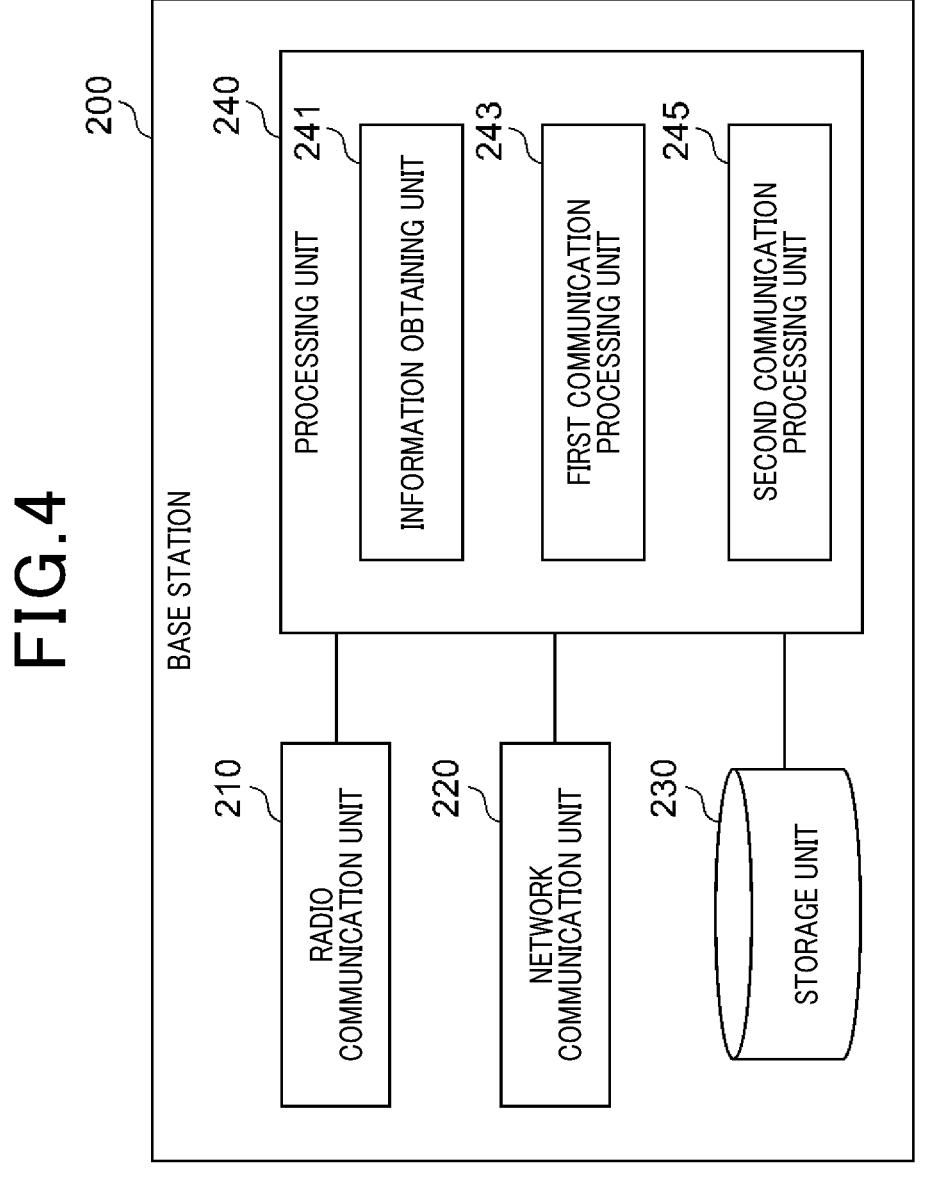
FIG. 4 is a block diagram illustrating an example of a schematic functional configuration of a base station according to embodiments of the present disclosure.
Figure 5:
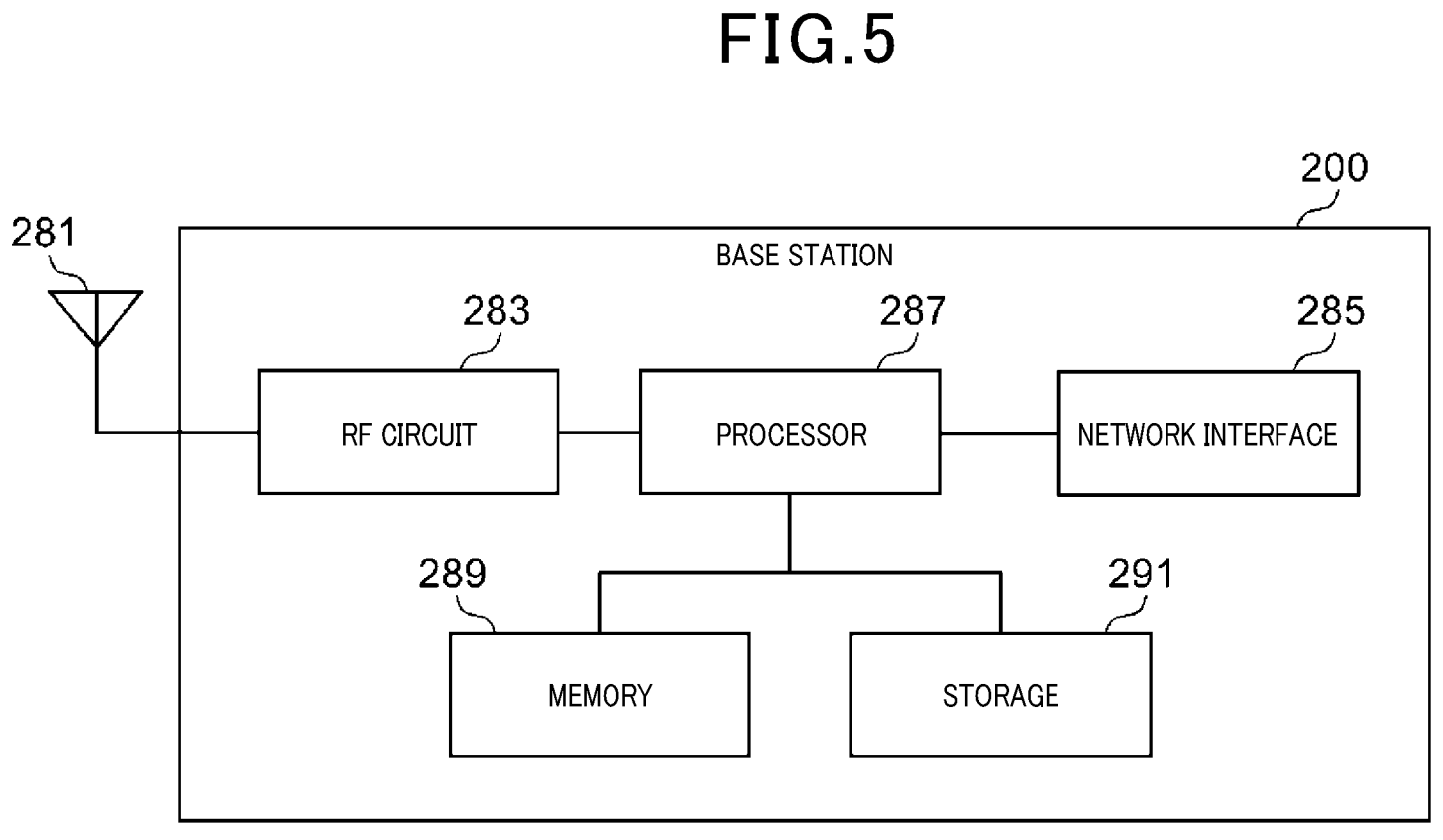

An example of a configuration of the base station 200 according to embodiments of the present disclosure will be described with reference to FIGS. 4 and 5.

(1) Functional Configuration

First, an example of a functional configuration of the base station 200 according to embodiments of the present disclosure will be described with reference to FIG. 4. Referring to FIG. 4, the base station 200 includes a radio communication unit 210, a network communication unit 220, a storage unit 230, and a processing unit 240.

The radio communication unit 210 wirelessly transmits and receives signals. For example, the radio communication unit 210 receives a signal from a UE and transmits a signal to the UE.

The network communication unit 220 receives a signal from a network and transmits a signal to the network.

The storage unit 230 stores various kinds of information for the base station 200.

The processing unit 240 provides various functions of the base station 200. The processing unit 240 includes an information obtaining unit 241, a first communication processing unit 243, and a second communication processing unit 245. Note that the processing unit 240 may further include another component in addition to these components. That is, the processing unit 240 may also perform an operation other than operations of these components. Specific operations of the information obtaining unit 241, the first communication processing unit 243, and the second communication processing unit 245 will be described in detail later.

For example, the processing unit 240 (first communication processing unit 243) communicates with a UE (for example, UE 100) via the radio communication unit 210. For example, the processing unit 240 (second communication processing unit 245) communicates with another node (for example, a network node in the core network or another base station) via the network communication unit 220.

(2) Hardware Configuration

Next, an example of a hardware configuration of the base station 200 according to embodiments of the present disclosure will be described with reference to FIG. 5. Referring to FIG. 5, the base station 200 includes an antenna 281, an RF circuit 283, a network interface 285, a processor 287, a memory 289, and a storage 291.

The antenna 281 converts signals into radio waves and emits the radio waves into the air. In addition, the antenna 281 receives radio waves in the air and converts the radio waves into signals. The antenna 281 may include a transmitting antenna and a receiving antenna or may be a single antenna for transmission and reception. The antenna 281 may be a directional antenna and may include a plurality of antenna elements.

The RF circuit 283 performs analog processing on signals that are transmitted and received via the antenna 281. The RF circuit 283 may include a high-frequency filter, an amplifier, a modulator, a lowpass filter, and the like.

The network interface 285 is, for example, a network adaptor, and transmits a signal to a network and receives a signal from the network.

The processor 287 performs digital processing on signals that are transmitted and received via the antenna 281 and the RF circuit 283. The digital processing includes processing of the RAN protocol stack. The processor 287 also performs processing on signals that are transmitted and received via the network interface 285. The processor 287 may include a plurality of processors or may be a single processor. The plurality of processors may include a baseband processor that performs the digital processing and one or more processors that perform other processing.

The memory 289 stores a program to be executed by the processor 287, a parameter related to the program, and other various kinds of information. The memory 289 may include at least one of a read only memory (ROM), an erasable programmable read only memory (EPROM), an electrically erasable programmable read only memory (EEPROM), a random access memory (RAM), and a flash memory. The whole or part of the memory 289 may be included in the processor 287.

The storage 291 stores various kinds of information. The storage 291 may include at least one of a solid state drive (SSD) and a hard disc drive (HDD).

The radio communication unit 210 may be implemented by the antenna 281 and the RF circuit 283. The network communication unit 220 may be implemented by the network interface 285. The storage unit 230 may be implemented by the storage 291. The processing unit 240 may be implemented by the processor 287 and the memory 289.

Part or the whole of the processing unit 240 may be virtualized. In other words, the part or the whole of the processing unit 240 may be implemented as a virtual machine. In this case, the part or the whole of the processing unit 240 may operate as a virtual machine on a physical machine (that is, hardware) including a processor, a memory, and the like and a hypervisor.

Given the hardware configuration described above, the base station 200 may include a memory (that is, memory 289) that stores a program and one or more processors (that is, processor 287) capable of executing the program and the one or more processors may perform operations of the processing unit 240 by executing the program. The program may be a program for causing the processors to execute the operations of the processing unit 240.

4. Operation Examples

Examples of operations of the UE 100 and the base station 200 according to embodiments of the present disclosure will be described with reference to FIGS. 6 to 10.

(1) Capability Information

The UE 100 transmits capability information to the base station 200. Specifically, the base station 200 transmits a capability enquiry to the UE 100. Upon receiving the capability enquiry, the UE 100 transmits the capability information to the base station 200.

The capability information indicates various types of capabilities of the UE 100. For example, the capability information includes frequency band information and frequency range information. The frequency band information indicates a frequency band allocated to communication between the UE 100 and the base station 200. The frequency range information indicates a modified frequency range available to the UE 100 in the frequency band. In addition, the frequency range information is different from maximum-power-reduction information. In other words, the frequency range information is information different from the maximum-power-reduction information.

Here, the modified frequency range is a frequency range obtained by modifying the available frequency range in a specific frequency band predefined in the TSs or a frequency range that is not predefined in the TSs, but is added as the available frequency range in the specific frequency band after the TSs are formulated. Therefore, the modified frequency range can also be regarded as a frequency range restricted in the specific frequency band.

The maximum-power-reduction information indicates a modified maximum power reduction (MPR) in the frequency band. The modified maximum power reduction is applied to the UE 100. The maximum power reduction is a condition related to adjacent leakage power that is defined chiefly for coexistence with a neighbor system. Specifically, the maximum power reduction is defined by using the value of a reduction in the maximum transmit power and the number of resource blocks. Note that the maximum power reduction includes an additional MPR (A-MPR). In a case where the MPR or the A-MPR is modified because of the laws and regulations, the modified MPR or A-MPR is added to the maximum-power-reduction information. In case of supporting the modified MPR or A-MPR, the UE 100 reports, to the base station 200, the maximum-power-reduction information indicating the modified MPR or A-MPR. The base station 200 performs resource allocation to the uplink of the UE 100 and power control for the uplink of the UE 100 on the basis of the maximum-power-reduction information.

The capability information is an RRC message. For example, the capability information is UECapabilityInformation. The capability information may be RF-Parameters, which is an element of UECapabilityInformation. An example of the capability information will be described with reference to FIG. 6. A part of RF-Parameters is described in a frame 10 of FIG. 6. RF-Parameters includes supported-BandListNR, which is a BandNR list. BandNR includes bandNR, which is the frequency band information, and modifiedRestrictedRange-r16, which is the frequency range information. bandNR indicates a specific frequency band and modifiedRestrictedRange-r16 indicates a frequency range that is available in the specific frequency band and modified after the TSs in a specific version are formulated. modifiedRestrictedRange is a bit string.

In this way, the use of the RRC message makes it possible to efficiently transmit the frequency range information, which is static information, to the base station 200. In addition, the frequency range information is defined as an additional information element of existing RF-Parameters to make it possible to suppress an increase in communication resources for signaling.

The frequency range information may correspond to a version of the specifications of communication. The frequency range information may be prepared for each of the versions. For example, modifiedRestrictedRange-r16 illustrated in FIG. 6 is the frequency range information corresponding to release-16 of the TSs. Naturally, the frequency range information may correspond to a detailed version following this release.

In this way, the frequency range information is prepared for each of the versions of the TSs to make it possible to increase extensibility for increasing modifications of the frequency ranges.

The frequency range information will be described in further detail with reference to FIG. 7. The frequency range information is a bit string as described above and each of the bits included in the bit string corresponds to a modified frequency range. In a table 20 of FIG. 7, NR Band corresponds to a frequency band, Index of field corresponds to the respective bits of the bit string, and Definition corresponds to the frequency range information indicating a modified frequency range for the frequency band. Further, each bit included in the bit string corresponds to an area to which the modified frequency range is applied. For example, in a case where the 0-th bit of the bit string is 1 in the table 20 of FIG. 7, it is indicated that the frequency range available for a frequency band n77 in the USA is 3450 to 3550 MHz and 3700 to 3980 MHz.

Note that the combination of the bits included in the bit string may correspond to a modified frequency range. For example, Index of field in the table 20 of FIG. 7 may correspond to the combination of the bits included in the bit string. For example, the bit string has 1 for the 0-th bit and the first bit (that is, 11000000 when the bit string has 8 bits), it may be indicated that the frequency range available for the frequency band n77 in the USA is 3450 to 3550 MHz and 3700 to 3980 MHz.

In this way, a modified frequency range corresponds to an area to make it possible to determine whether or not the UE 100 supports even the area to which the modified frequency range is applied in addition to the value of the modified frequency range. Here, unless a UE is certified by the Radio Act or the like in an area in which the UE operates, the UE is not permitted to operate in the area. This configuration makes it possible to determine whether or not the UE is certified. That is, it is possible to determine whether or not the UE is operable within the frequency range in the area.

Note that a modified frequency range is defined only for the 0-th bit in the example of FIG. 7. However, in a case where the laws and regulations are amended in any of the areas to modify the frequency range for n77, the modified frequency range is additionally defined for a bit that has not yet been used.

In addition, in a case where a plurality of areas has the same modified frequency range, the modified frequency range in the plurality of areas may be expressed with one bit. For example, in a case where the same laws and regulations on the frequency band n77 as those of the USA are assumed to be applied to Japan, Japan may be added as an area corresponding to the 0-th bit in the table 20 of FIG. 7.

In addition, in a case where a plurality of areas has the same modified frequency range, the modified frequency range in the plurality of areas may be expressed with one bit for each of the plurality of areas. For example, in a case where the same laws and regulations on the frequency band n77 as those of the USA are assumed to be applied to Japan, the USA may be still an area corresponding to the 0-th bit in the table 20 of FIG. 7 and Japan may be added as an area corresponding to the first bit.

In addition, the modified frequency range for each of the bits may overlap with the modified frequency range for another bit. For example, the modified frequency range corresponding to the 0-th bit in the table 20 of FIG. 7 may be 3700 to 3980 MHz and the modified frequency range corresponding to the first bit may be 3450 to 3550 MHz and 3700 to 3980 MHz.

In addition, the modified frequency range for each of the bits and the modified frequency range for another bit may be mutually exclusive. For example, the modified frequency range corresponding to the 0-th bit in the table 20 of FIG. 7 may be 3700 to 3980 MHz and the modified frequency range corresponding to the first bit may be 3450 to 3550 MHz.

In addition, a different modified frequency range may be defined for a different frequency band. For example, a modified frequency range for a frequency band n41, which is 2496 MHz to 2690 MHz, may be defined in the table 20 of FIG. 7 separately from the frequency band n77. Specifically, in the frequency range information (bit string) related to the frequency band n41, the 0-th bit may indicate that the modified frequency range in Japan is 2500 MHz to 2550 MHz and the first bit may indicate that the modified frequency range in Japan, the USA, and Europe is 2500 MHz to 2600 MHz.

The presence or absence of the frequency range information will be described with reference to FIG. 8. The frequency range information is optional information. Specifically, the UE 100 (communication processing unit 133) transmits the capability information including the frequency range information to the base station 200 in the presence of a modified frequency range. The UE 100 (communication processing unit 133) transmits the capability information that does not include the frequency range information to the base station 200 in the absence of a modified frequency range. For example, as indicated in a table 30 of FIG. 8, this indicates whether the UE 100 further supports the modified frequency range or supports only a frequency range predefined in the TSs on the basis of whether or not modifiedRestrictedRange-r16, which is the frequency range information, is included in the capability information (that is, RF-Parameters or BandNR, which is a component thereof). Note that, in a case where the modified frequency range is absent and the TSs predefines no frequency range, the whole of a specific frequency band is applied to the UE 100 as the available frequency range.

In a case where the capability information including the frequency range information is received, the base station 200 uses the frequency range information included in the capability information for communication with the UE 100. Specifically, the base station 200 (first communication processing unit 243) applies a modified frequency range indicated by the frequency range information included in the received capability information to the UE 100. For example, the modified frequency range corresponding to a bit having a value of 1 in the bit string of modifiedRestrictedRange-r16 included in the capability information is applied to the UE 100.

In a case where the capability information that does not include the frequency range information is received, the base station 200 uses the frequency range information indicating the frequency range predefined for communication with the UE 100. Specifically, in a case where the capability information that does not include the frequency range information is received, the base station 200 (first communication processing unit 243) applies the frequency range predefined in the specifications of communication to the UE 100. For example, the frequency range defined in 3GPP TS 38.101-1 and TS 38.101-2 is applied to the UE 100.

In this way, the frequency range information is optional to make it possible to reduce communication volume as compared with communication volume for the mandatory frequency range information. In addition, not transmitting the frequency range information also has a meaning. This makes it possible to report a frequency range to be applied to the UE 100 to the base station 200 without increasing communication volume. In particular, signaling occurs periodically and it is thus preferable to suppress an increase in communication volume for signaling.

In addition, the capability information includes the maximum-power-reduction information. Specifically, the capability information includes the frequency range information and the maximum-power-reduction information each corresponding to a frequency band indicated by the frequency band information. For example, in FIG. 6, BandNR included in RF-Parameters includes modifiedMPR-Behavior, which is the maximum-power-reduction information. modifiedMPR-Behavior indicates a maximum power reduction that is applied in a frequency band indicated by bandNR and modified after the TSs are formulated. BandNR includes modifiedRestrictedRange-r16 and modifiedMPR-Behavior each corresponding to the frequency band indicated by bandNR.

In this way, the frequency range information is handled as information different from the maximum-power-reduction information, but collectively handled as information corresponding to the frequency band information to make it possible to reduce communication volume as compared with communication volume for individually handling the frequency range information and the maximum-power-reduction information.

In addition, the maximum-power-reduction information is optional information. A condition for presence of the frequency range information and a condition for presence of the maximum-power-reduction information are different. Specifically, the UE 100 (communication processing unit 133) transmits the capability information including the maximum-power-reduction information to the base station 200 in the presence of a modified maximum power reduction. The UE 100 (communication processing unit 133) transmits the capability information that does not include the maximum-power-reduction information to the base station 200 in the absence of a modified maximum power reduction. The condition for presence of the frequency range information is the presence of a modified frequency range. Meanwhile, the condition for presence of the maximum-power-reduction information is the presence of a modified maximum power reduction. The condition for presence of the frequency range information and the condition for presence of the maximum-power-reduction information are thus different. This forms patterns in which that BandNR as illustrated in FIG. 6 includes any one of the frequency range information or the maximum-power-reduction information, BandNR includes both of them, and BandNR includes none of them.

In this way, the different frequency range information and the maximum-power-reduction information each having a different condition for presence thereof are each defined as different information to make it possible to avoid complexity. For example, in a case where a modified frequency range is reported by using the maximum-power-reduction information, the maximum-power-reduction information is transmitted in the presence of the modified frequency range in spite of the absence of any modified maximum power reduction. This increases the complexity of the information. This configuration makes it possible to avoid such complexity.

(2) Obtainment of Information Related to Neighbor Base Station

The base station 200 obtains information related to a neighbor base station. Specifically, the base station 200 (second communication processing unit 245) obtains the information related to the neighbor base station via an Xn interface. For example, the base station 200 executes Global Procedures based on XnAP to obtain the information related to the neighbor base station. For example, the base station 200 executes a signaling procedure such as Xn Setup or NG-RAN Node Configuration Update. In the signaling procedure, Neighbor Information NR is received from the neighbor base station as the information related to the neighbor base station. Neighbor Information NR includes NR Frequency Info, which is frequency information related to the neighbor base station.

(3) Handover Control

The base station 200 performs handover control for the UE 100. Specifically, the base station 200 performs handover control for the UE 100 on the basis of the capability information related to the UE 100. For example, the base station 200 (first communication processing unit 243) selects a base station (that is, cell) adaptable to a modified frequency range indicated by the received frequency range information as a handover target for the UE 100.

Figure 9:
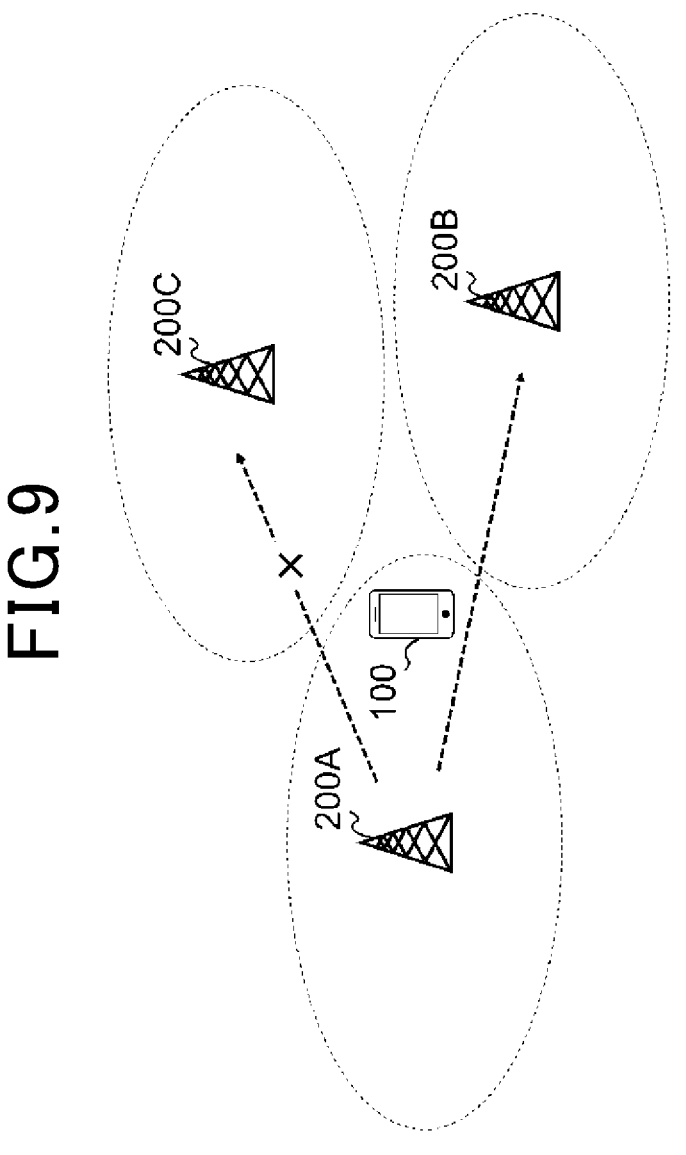
FIG. 9 is a diagram for explaining an example of a handover process based on the frequency range information according to embodiments of the present disclosure.

The handover control will be described in detail with reference to FIG. 9. For example, the base station 200A determines whether or not to hand over the connected UE 100. In case of determining that the UE 100 is handed over, the base station 200A determines whether or not the capability information related to the UE 100 has a modified frequency range.

In case of determining the presence of a modified frequency range, the base station 200A selects a handover target for the UE 100 from the neighbor base station 200B and a neighbor base station 200C on the basis of the respective obtained pieces of frequency information related to the base station 200B and the base station 200C and the modified frequency range. For example, it will be assumed that the base station 200B is adapted to a frequency range of 3450 to 3550 MHz, the base station 200C is adapted to a frequency range of 3700 to 3980 MHz, and a modified frequency range indicated by the frequency range information related to the UE 100 is 3450 to 3550 MHz and 3700 to 3980 MHz for the frequency band n77. In this case, the base station 200A selects any of the base station 200B or the base station 200C as a handover target. The base station 200A requests a handover from the selected base station 200.

In case of determining the absence of a modified frequency range, the base station 200A selects a handover target for the UE 100 from the neighbor base station 200B and a neighbor base station 200C on the basis of the respective obtained pieces of frequency information related to the base station 200B and the base station 200C and the frequency range predefined in the TSs for the UE 100. For example, it will be assumed that the base station 200B is adapted to a frequency range of 3450 to 3550 MHz, the base station 200C is adapted to a frequency range of 3700 to 3980 MHz, and the frequency range predefined in the TSs is 3700 to 3980 MHz for the frequency band n77. In this case, the base station 200A selects the base station 200C as a handover target. This is because it is the base station 200C that covers the frequency range within which the UE 100 is operable. The base station 200A requests a handover from the selected base station 200C.

In this way, the base station 200 that covers the modified frequency range is selected as a handover target to make it possible to hand over the serving cell to the base station 200 with which the UE 100 is communicable.

Note that the example of handover control based on Xn has been described above, but other handover control may be performed. For example, handover control based on N2 may be performed. Specifically, handover control is performed on the basis of signaling between the base station 200 and the core network via a next generation (NG) interface.

(4) Flow of Processing

Figure 10:
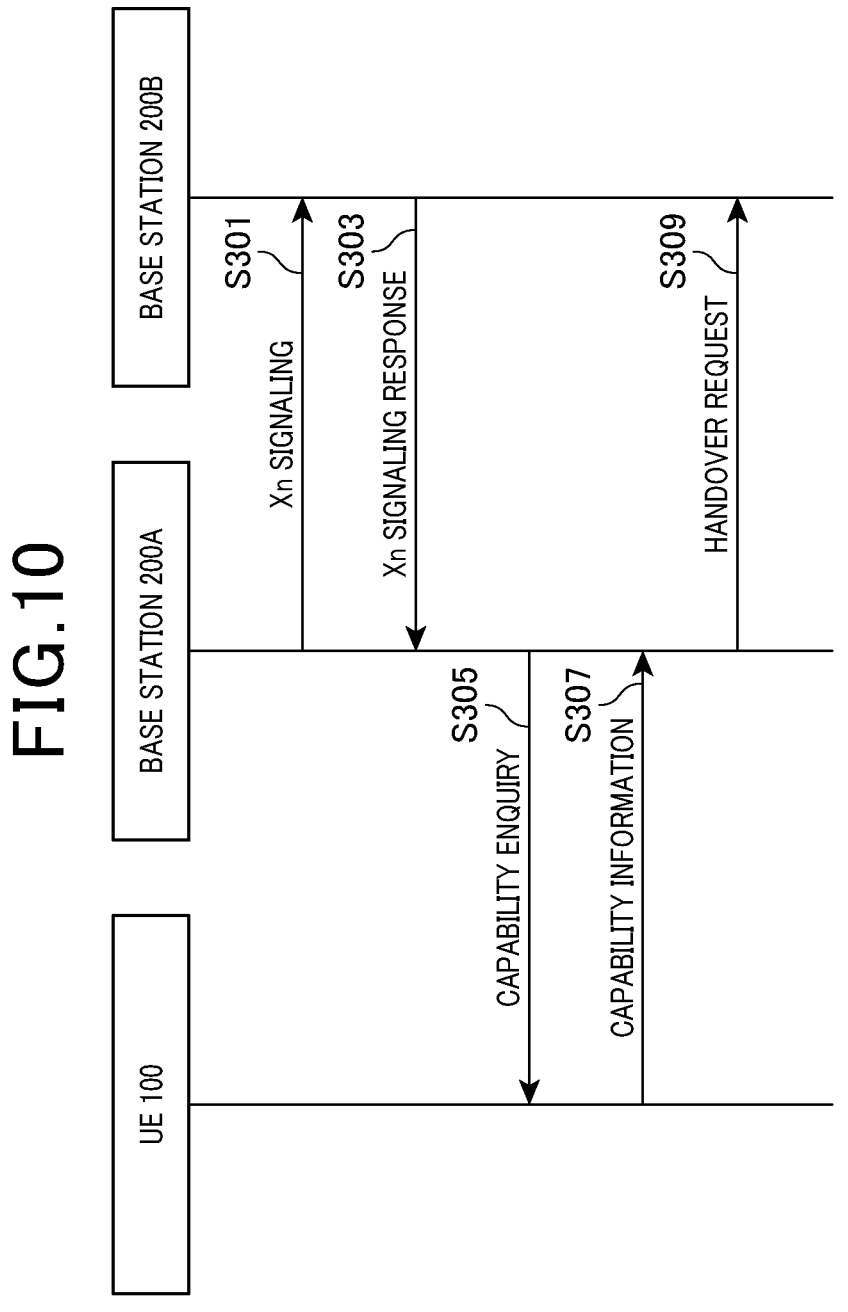
FIG. 10 is a sequence diagram for explaining an example of a schematic flow of processing according to embodiments of the present disclosure.

The flow of processing according to embodiments of the present disclosure will be described with reference to FIG. 10. In the example of FIG. 10, the UE 100 and the base station 200A have a communication connection.

The base station 200A transmits an Xn signaling to the base station 200B (S301). For example, the base station 200A transmits an Xn Setup Request to the base station 200B in XnAP.

The base station 200B transmits an Xn signaling response to the base station 200A (S303). For example, upon receiving an Xn Setup Request, the base station 200B transmits an Xn Setup Response including NR Frequency Info to the base station 200A in XnAP. NR Frequency Info is the frequency information related to the base station 200B.

Note that FIG. 10 illustrates an example in which the signaling procedure based on XnAP is Xn Setup, but the signaling procedure may be NG-RAN Node Configuration Update. In this case, the base station 200A transmits an NG-RAN Node Configuration Update instead of an Xn Setup Request and the base station 200B transmits an NG-RAN Node Configuration Acknowledge instead of an Xn Setup Response.

The base station 200A transmits a capability enquiry to the UE 100 (S305). For example, the base station 200A transmits a UECapabilityEnquiry to the UE 100.

The UE 100 transmits the capability information to the base station 200A (S307). For example, in a case where a modified frequency range is present (that is, in a case where the UE 100 supports a modified frequency range), the UE 100 transmits a UECapabilityInformation including the frequency range information indicating the modified frequency range to the base station 200A. In a case where a modified frequency range is absent (that is, in a case where the UE 100 does not support a modified frequency range), the UE 100 transmits a UECapabilityInformation that does not include the frequency range information to the base station 200A.

The base station 200A transmits a handover request to the base station 200B (S309). For example, the base station 200A selects the base station 200B as a handover target on the basis of the frequency information received from the base station 200B and the frequency range information received from the UE 100A. The base station 200A then transmits a Handover Request to the selected base station 200B in XnAP.

In this way, according to embodiments of the present disclosure, the capability information including the frequency band information and the frequency range information different from the maximum-power-reduction information is transmitted to the base station 200, the frequency range information is a bit string, and each of the bits included in the bit string corresponds to a modified frequency range. Here, even after the TSs are formulated, the frequency range can be additionally modified by the laws and regulations. This requests the modified frequency range to be reported to the base station 200. However, in a case where the report is made by using the maximum-power-reduction information, extensibility is low for increasing modifications of the maximum power reduction and the frequency range.

In contrast, according to embodiments of the present disclosure, the frequency range information is used to report a modified frequency range separately from the maximum-power-reduction information. This makes it possible to extend adaptation capacity for a modification of the frequency range. In addition, each of the bits included in a bit string that is the frequency range information or the combination of the bits included in the bit string corresponds to a modified frequency range. This makes it possible to additionally adapt to additional modifications of frequency ranges caused by the laws and regulations. It is thus possible to increase extensibility for modifications of frequency ranges available to the UE 100 in an allocated frequency band.

5. Modification Examples

In the example described in embodiments of the present disclosure, the system 1 is a system compliant with the TSs of 5G or NR. However, the system 1 according to embodiments of the present disclosure is not limited to this example.

In a modification example of embodiments of the present disclosure, the system 1 may be a system compliant with other TSs in 3GPP. As an example, the system 1 may be a system compliant with the TSs of long term evolution (LTE), LTE advanced (LTE-A), or 4G and the base station 200 may be an evolved node B (eNB). Alternatively, the base station 200 may be an ng-eNB. As another example, the system 1 may be a system compliant with the TSs of 3G and the base station 200 may be a Node B. As yet another example, the system 1 may be a system compliant with next generation (for example, 6G) TSs.

Alternatively, the system 1 may be a system compliant with TSs of another standards organization for mobile communications.

While embodiments of the present disclosure have been described above, the present disclosure is not limited to the embodiments. It will be understood by those skilled in the art that the embodiments are merely examples and various changes can be made without departing from the scope and the spirit of the present disclosure.

For example, steps in a process described in the present specification do not necessarily have to be executed chronologically in the order described in the flowchart or the sequence diagram. For example, steps in a process may be executed in an order different from the order described as the flowchart or the sequence diagram or may be executed in parallel. In addition, some of steps in a process may be removed or a further step may be added to the process.

For example, there may be provided a method including the operations of one or more components of the apparatus described in the present specification or there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile apparatus, mobile unit, subscriber station, subscriber terminal, subscriber apparatus, subscriber unit, wireless station, wireless terminal, wireless apparatus, wireless unit, remote station, remote terminal, remote apparatus, or remote unit.

For example, in the present disclosure, "transmit" may mean performing processing of at least one layer in a protocol stack used for transmission or physically transmitting a signal wirelessly or by wire. Alternatively, "transmit" may mean a combination of performing the processing of the at least one layer and physically transmitting a signal wirelessly or by wire. Similarly, "receive" may mean performing processing of at least one layer in a protocol stack used for reception or physically receiving a signal wirelessly or by wire. Alternatively, "receive" may mean a combination of performing the processing of the at least one layer and physically receiving a signal wirelessly or by wire. The at least one layer may be replaced with at least one protocol. For example, in the present disclosure, "obtain/acquire" may mean obtaining/acquiring information from stored information, obtaining/acquiring information from information received from another node, or obtaining/acquiring information by generating the information.

For example, in the present disclosure, "include" and "comprise" do not mean that listed items alone are included, but mean that listed items alone may be included or a further item may be included in addition to the listed items.

For example, in the present disclosure, "or" does not mean exclusive OR, but means inclusive OR.

Note that the technical features included in the embodiments may be represented as the following features. Naturally, the present disclosure is not limited to the following features.

(Feature 1) A user equipment (100) comprising:

an information obtaining unit (131) configured to obtain frequency band information and frequency range information, the frequency band information indicating a frequency band allocated to communication between the user equipment and a base station (200), the frequency range information indicating a modified frequency range available to the user equipment in the frequency band; and a communication processing unit (133) configured to transmit capability information to the base station, the capability information including the frequency band information and the frequency range information, wherein the frequency range information is different from maximum-power-reduction information indicating a modified maximum power reduction in the frequency band, the modified maximum power reduction being applied to the user equipment, the frequency range information is a bit string, and each of bits included in the bit string or a combination of the bits included in the bit string corresponds to the modified frequency range.

(Feature 2) The user equipment according to Feature 1, wherein each of the bits included in the bit string or the combination of the bits included in the bit string further corresponds to an area to which the modified frequency range is applied.

(Feature 3) The user equipment according to Feature 1 or 2, wherein the frequency range information is optional information.

(Feature 4) The user equipment according to Feature 3, wherein the communication processing unit is configured to transmit the capability information that does not include the frequency range information to the base station in absence of the modified frequency range.

(Feature 5) The user equipment according to any one of Features 1 to 4, wherein the capability information is a radio resource control (RRC) message.

(Feature 6) The user equipment according to Feature 5, wherein the capability information is RF-Parameters, which is an element of UECapabilityInformation, which is an RRC message.

(Feature 7) The user equipment according to any one of Features 1 to 6, wherein the frequency range information corresponds to a version of a specification of the communication.

(Feature 8) The user equipment according to any one of Features 1 to 7, wherein the capability information includes the frequency range information and the maximum-power-reduction information each corresponding to the frequency band indicated by the frequency band information.

(Feature 9) The user equipment according to Feature 8, wherein the frequency range information and the maximum-power-reduction information are pieces of optional information, and a condition for presence of the frequency range information and a condition for presence of the maximum-power-reduction information are different.

(Feature 10) A base station (200) comprising:

a communication processing unit (243) configured to receive capability information from a user equipment (100), the capability information including frequency band information and frequency range information, the frequency band information indicating a frequency band allocated to communication between the user equipment and the base station, the frequency range information indicating a modified frequency range available to the user equipment in the frequency band; and an information obtaining unit (241) configured to obtain the frequency band information and the frequency range information from the capability information, wherein the frequency range information is different from maximum-power-reduction information indicating a maximum power reduction in the frequency band, the maximum power reduction being applied to the user equipment, the frequency range information is a bit string, and each of bits included in the bit string or a combination of the bits included in the bit string corresponds to the modified frequency range.

(Feature 11) The base station according to Feature 10, wherein the communication processing unit is configured to apply the modified frequency range to the user equipment, the modified frequency range being indicated by the frequency range information included in the received capability information.

(Feature 12) The base station according to Feature 11, wherein the communication processing unit is configured to apply a frequency range or the frequency band to the user equipment in a case where the capability information that does not include the frequency range information is received, the frequency range being predefined in a specification of the communication.

(Feature 13) The base station according to any one of Features 10 to 12, wherein the communication processing unit is configured to select a base station as a handover target for the user equipment, the base station being adaptable to the modified frequency range indicated by the received frequency range information.

(Feature 14) A method performed by a user equipment (100), comprising:

obtaining frequency band information and frequency range information, the frequency band information indicating a frequency band allocated to communication between the user equipment and a base station (200), the frequency range information indicating a modified frequency range available to the user equipment in the frequency band; and transmitting capability information to the base station, the capability information including the frequency band information and the frequency range information, wherein the frequency range information is different from maximum-power-reduction information indicating a modified maximum power reduction in the frequency band, the modified maximum power reduction being applied to the user equipment, the frequency range information is a bit string, and each of bits included in the bit string or a combination of the bits included in the bit string corresponds to the modified frequency range.

(Feature 15) A method performed by a base station (200), comprising:

receiving capability information from a user equipment (100), the capability information including frequency band information and frequency range information, the frequency band information indicating a frequency band allocated to communication between the user equipment and the base station, the frequency range information indicating a modified frequency range available to the user equipment in the frequency band; and obtaining the frequency band information and the frequency range information from the capability information, wherein the frequency range information is different from maximum-power-reduction information indicating a maximum power reduction in the frequency band, the maximum power reduction being applied to the user equipment, the frequency range information is a bit string, and each of bits included in the bit string or a combination of the bits included in the bit string corresponds to the modified frequency range.

(Feature 16) A program for causing a computer to execute operations of:

obtaining frequency band information and frequency range information, the frequency band information indicating a frequency band allocated to communication between a user equipment (100) and a base station (200), the frequency range information indicating a modified frequency range available to the user equipment in the frequency band; and transmitting capability information to the base station, the capability information including the frequency band information and the frequency range information, wherein the frequency range information is different from maximum-power-reduction information indicating a modified maximum power reduction in the frequency band, the modified maximum power reduction being applied to the user equipment, the frequency range information is a bit string, and each of bits included in the bit string or a combination of the bits included in the bit string corresponds to the modified frequency range.

(Feature 17) A program for causing a computer to execute operations of:

receiving capability information from a user equipment (100), the capability information including frequency band information and frequency range information, the frequency band information indicating a frequency band allocated to communication between the user equipment and a base station (200), the frequency range information indicating a modified frequency range available to the user equipment in the frequency band; and obtaining the frequency band information and the frequency range information from the capability information, wherein the frequency range information is different from maximum-power-reduction information indicating a maximum power reduction in the frequency band, the maximum power reduction being applied to the user equipment, the frequency range information is a bit string, and each of bits included in the bit string or a combination of the bits included in the bit string corresponds to the modified frequency range.

(Feature 18) A non-transitory tangible computer-readable storage medium having stored therein a program for causing a computer to execute operations of:

obtaining frequency band information and frequency range information, the frequency band information indicating a frequency band allocated to communication between a user equipment (100) and a base station (200), the frequency range information indicating a modified frequency range available to the user equipment in the frequency band; and transmitting capability information to the base station, the capability information including the frequency band information and the frequency range information, wherein the frequency range information is different from maximum-power-reduction information indicating a modified maximum power reduction in the frequency band, the modified maximum power reduction being applied to the user equipment, the frequency range information is a bit string, and each of bits included in the bit string or a combination of the bits included in the bit string corresponds to the modified frequency range.

(Feature 19) A non-transitory tangible computer-readable storage medium having stored therein a program for causing a computer to execute operations of:

receiving capability information from a user equipment (100), the capability information including frequency band information and frequency range information, the frequency band information indicating a frequency band allocated to communication between the user equipment and a base station (200), the frequency range information indicating a modified frequency range available to the user equipment in the frequency band; and obtaining the frequency band information and the frequency range information from the capability information, wherein the frequency range information is different from maximum-power-reduction information indicating a maximum power reduction in the frequency band, the maximum power reduction being applied to the user equipment, the frequency range information is a bit string, and each of bits included in the bit string or a combination of the bits included in the bit string corresponds to the modified frequency range.

What is claimed is:

1. A terminal apparatus comprising:

a communicator configured to transmit, to a base station apparatus, capability information including radio frequency parameters; and a processor configured to:

include an information bit indicating that the terminal apparatus supports restricted ranges of a frequency band in a specific area and an information bit indicating that the terminal apparatus supports a modified maximum power reduction behavior indicated per frequency band in the radio frequency parameters, in a case where the terminal apparatus supports first restricted ranges of the frequency band in the specific area and the modified maximum power reduction behavior indicated per frequency band; and not include the information bit indicating that the terminal apparatus supports the restricted ranges of the frequency band in the specific area in the radio frequency parameters and include the information bit indicating that the terminal apparatus supports the modified maximum power reduction behavior indicated per frequency band in the radio frequency parameters, in a case where the terminal apparatus supports a second range of the frequency band in the specific area and the modified maximum power reduction behavior indicated per frequency band, wherein the modified maximum power reduction behavior is defined based on a value of the maximum power reduction and a number of resource blocks.

2. The terminal apparatus according to claim 1, wherein the processor is configured to include an information bit indicating that the terminal apparatus supports restricted ranges of the frequency band in a different area than the specific area in the radio frequency parameters in a case where the terminal apparatus supports third restricted ranges of the frequency band in the different area than the specific area.

3. A base station comprising:

a communicator configured to receive, from a terminal apparatus, capability information including radio frequency parameters; and a processor configured to:

obtain an information bit indicating that the terminal apparatus supports restricted ranges of a frequency band in a specific area and an information bit indicating that the terminal apparatus supports a modified maximum power reduction behavior indicated per frequency band from the radio frequency parameters, in a case where the terminal apparatus supports first restricted ranges of the frequency band in the specific area and the modified maximum power reduction behavior indicated per frequency band; and obtain the information bit indicating that the terminal apparatus supports the modified maximum power reduction behavior indicated per frequency band from the radio frequency parameters, in a case where the terminal apparatus supports the modified maximum power reduction behavior indicated per frequency band, wherein the information bit indicating that the terminal apparatus supports the restricted ranges of the frequency band in the specific area is not included in the radio frequency parameters in a case where the terminal apparatus supports a second range of the frequency band in the specific area, and the modified maximum power reduction behavior is defined based on a value of the maximum power reduction and a number of resource blocks.

4. The base station according to claim 3, wherein the processor is configured to obtain an information bit indicating that the terminal apparatus supports restricted ranges of the frequency band in a different area than the specific area from the radio frequency parameters in a case where the terminal apparatus supports third restricted ranges of the frequency band in the different area than the specific area.

5. A communication method of a terminal apparatus comprising:

transmitting, to a base station apparatus, capability information including radio frequency parameters;

including an information bit indicating that the terminal apparatus supports restricted ranges of a frequency band in a specific area and an information bit indicating that the terminal apparatus supports a modified maximum power reduction behavior indicated per frequency band in the radio frequency parameters, in a case where the terminal apparatus supports first restricted ranges of the frequency band in the specific area and the modified maximum power reduction behavior indicated per frequency band; and not including the information bit indicating that the terminal apparatus supports the restricted ranges of the frequency band in the specific area in the radio frequency parameters and including the information bit indicating that the terminal apparatus supports the modified maximum power reduction behavior indicated per frequency band in the radio frequency parameters, in a case where the terminal apparatus supports a second range of the frequency band in the specific area and the modified maximum power reduction behavior indicated per frequency band, wherein the modified maximum power reduction behavior is defined based on a value of the maximum power reduction and a number of resource blocks.

6. The communication method according to claim 5, further comprising including an information bit indicating that the terminal apparatus supports restricted ranges of the frequency band in a different area than the specific area in the radio frequency parameters in a case where the terminal apparatus supports third restricted ranges of the frequency band in the different area than the specific area.

\* \* \* \* \*